United States Patent
Rabe et al.

[11] Patent Number: 6,148,595
[45] Date of Patent: Nov. 21, 2000

[54] PASSIVE DISTRIBUTION DEFLECTOR FOR GRASS CLIPPINGS COLLECTION SYSTEM

[75] Inventors: Brian A. Rabe, Oconomowoc; Franklin R. Pohlman, Jr., Fort Atkinson, both of Wis.

[73] Assignee: Ransomes America Corporation

[21] Appl. No.: 09/209,354

[22] Filed: Dec. 11, 1998

[51] Int. Cl.[7] .......................... A01D 67/00; A01D 43/00; A01D 43/06
[52] U.S. Cl. ............................................ 56/320.2; 56/202
[58] Field of Search .................................. 56/202, 320.2, 56/199, 203, 16.6, DIG. 20, DIG. 22

[56] References Cited

U.S. PATENT DOCUMENTS

| | | | |
|---|---|---|---|
| 3,974,631 | 8/1976 | Rhodes | 56/202 |
| 4,106,272 | 8/1978 | Peterson et al. | 56/202 |
| 4,257,334 | 3/1981 | Mueller . | |
| 4,258,539 | 3/1981 | Pearce et al. | 56/320.2 |
| 4,532,755 | 8/1985 | Schemelin et al. . | |
| 4,631,909 | 12/1986 | McLane | 56/202 |
| 4,723,398 | 2/1988 | Flenniken et al. . | |
| 4,738,088 | 4/1988 | Klever et al. | 56/202 |
| 4,761,943 | 8/1988 | Parker et al. | 56/202 |
| 4,782,650 | 11/1988 | Walker | 56/16.6 |
| 4,835,951 | 6/1989 | Walker | 56/16.6 |
| 4,921,469 | 5/1990 | Scharf . | |
| 4,986,063 | 1/1991 | Eggenmuller . | |
| 5,765,346 | 6/1998 | Benter et al. . | |
| 5,832,708 | 11/1998 | Sugden | 56/202 |

*Primary Examiner*—David Bagnell
*Assistant Examiner*—Arpad Fabian Kovacs
*Attorney, Agent, or Firm*—Harness, Dickey & Pierce, P.L.C.

[57] ABSTRACT

A passive distribution deflector for use in a grass collection system on a riding mower or the like. The deflector has a lower body portion having substantially closed side walls and an open bottom portion, and an open top portion having a cross-sectional area less than the open bottom portion. A top discharge member is formed on a deflector surface and has a plurality of curved regions, connected to the lower body portion. The curved regions each having longitudinal axis pointing in a direction different from the longitudinal axis of the lower portion, and the curved regions of the top discharge member are separated from one another by at least one ridge portion.

18 Claims, 4 Drawing Sheets

PASSIVE DISTRIBUTION DEFLECTOR FOR GRASS CLIPPINGS COLLECTION SYSTEM

FIELD OF THE INVENTION

This invention relates to grass clipping collection systems for riding mowers, and more specifically, to a passive deflector, mounted inside a large collection container of a power fan-driven grass collection system, for distributing the collected grass evenly within the container by splitting the air-borne grass clippings into separately directed streams.

BACKGROUND OF THE INVENTION

Grass collection systems on commercial mowers, particularly riding mowers, are commonly used and highly desirable, particularly when the grass is long or the turf growth has been heavy. These collection systems provide an easy means for the operator to collect and dispose of excess grass clippings. These collection systems are being made larger, and often are powered, not only by the air stream generated by the cutting blades rotating at a high speed, but also by an auxiliary blower, such as a centrifugal fan. In this manner, the grass clippings can be directed rearwardly to a large capacity collection container, so that the operator can spend more time mowing, and less time emptying the container. However, having a large container remotely mounted from the mower deck has created its own set of problems, such providing for a way to distribute the grass clippings relatively evenly within the collection container to maximize the amount of grass that can be loaded before the container needs to be emptied.

One problem that is encountered is the loading of grass clippings in one spot only in the container. The effect of concentrating the load in one area of the container is that other areas of the container, such as the corners, are not filled to their capacity. This loading problem is further exacerbated when the grass being cut is long and/or wet. At times, the outlet into the collection container may clog, and/or the chutes leading from the mower deck to the container may clog. In some grass collection systems, the clippings under certain conditions may tend to build up right in front of the chute outlet, eventually blocking the entrance of additional clippings well before the collection hopper is filled.

One widely used solution to the foregoing distribution problem has been to provide for moving baffle or arm that waves back and forth in the discharge path of outlet this chute which directs the grass to different parts of the container. This approach requires a mechanical drive system for providing the necessary reciprocating motion. Also, appropriate linkages that can withstand overloads in the event that the chute clogs must be provided as part of this drive system, since this can happen under certain circumstances, such as very wet caking grass or an overfilled hopper. This mechanical system in turn creates additional maintenance requirements, and need to take appropriate precautions to avoid creating pinch points, etc. It also adds to the cost of the collection system.

The waving arm or baffle that is inserted into the air stream also has the disadvantage of incrementally increasing the back pressure at the outlet of the discharge chute into the collection hopper, and increasing turbulence, which can help slow down the moving stream of grass clippings, and promote clogging.

Therefore, it is a primary object of the present invention to provide a passive deflector that is able to direct the grass clippings to various locations within the grass collection container so as to optimally utilize all of the space within the hopper.

It is a further object of the present invention to provide a deflector system having a favorable outlet geometry that reduces the back pressure introduced into head of the airflow from the duct outlet.

It is yet a further object of the present invention to provide a passive deflector system that utilizes no moving parts, is less expensive to provide, and easier to maintain than the deflector systems which employ a moving arm.

It is yet a further object of the present invention to provide a passive deflector that includes curved regions on a concave surface for directing a common stream of air-borne grass clippings to distinct areas within a grass collection container.

One more object is to provide an improved discharge chute geometry for a deflector that is arranged to be largely self-cleaning so as to reduce buildup and clogging at the chute outlet.

SUMMARY OF THE INVENTION

In order to overcome the aforementioned problems, and to achieve most if not all of the foregoing objects, there is provided, according to one aspect of the present invention, a passive deflector apparatus of the present invention for use in a grass collection system on a riding mower or similar device. The deflector apparatus includes a lower body portion that has side walls which are substantially closed. The lower body portion also includes an open top portion that has a cross-sectional area less than the open bottom portion. The deflector apparatus also includes a top discharge member that is connected to the lower body portion. The top discharge member is formed on a deflector surface that has a plurality of curved regions. Each curved region has a longitudinal axis pointing in a direction different from the longitudinal axis of the lower portion. Additionally, the curved regions are separated from one another by at least one ridge portion.

According to another aspect of the present invention, there is provided a plurality of curved regions are defined by two portions of the concave surface forming a substantially V-shaped ridge. The curved regions create a separate first, second and third longitudinal airflow. The first separate airflow is directed to a first inside surface of the grass collection container, the second separate airflow is directed to a second inside surface, and the third separate airflow is directed to a third inside surface.

It is believed that one of the advantages of the passive deflector of the present invention is that the airflow within the separate zones immediately downstream of the duct outlet is less turbulent and is believed to be more laminar than in mechanical deflection systems having a moving paddle placed into the airstream of the duct outlet. Another advantage is that the airstream speed can remain higher to help distribute the clippings further along into the collection receptacle. Still another advantage is smooth transition regions are provided along the generally concave areas of the passive duct, so as to minimize the tendency for any grass clippings to stick on the inside walls thereof. Further, once the common stream of grass clippings are spread into three separate streams by the passive deflector, and these three streams pass beyond the immediate region of deflector chute, these air streams are quickly decelerated upon emergence from the duct outlet. Thus, as the duct opens abruptly into a wide chamber at its upper end, the air stream issuing from the duct is abruptly deflected, airflow out of the duct will be correspondingly retarded, and the grass clipping distribution is increased.

The particular configuration allows for the deceleration of the grass clippings at a distance from the chute opening which reduces the likelihood of clogging. Further, the location of the deceleration allows for a more even distribution of the clippings within the storage bin. Considered from another standpoint, the necessary high airflow velocity, along a duct having an unfavorable outlet geometry, can be obtained by pumping more air into the inlet of the duct; but doing so requires more power, so that the mower must have a larger engine with the correspondingly higher fuel consumption. In this respect, it is observed that substantially more horsepower is consumed by a rotary mower blade in generating an air draft than in actually cutting through the grass.

BRIEF DESCRIPTION OF DRAWINGS

The drawings, which form an integral part of the specification, are to be read in conjunction therewith, and a like reference numerals are employed to designate identical components in the various views.

DETAILED DESCRIPTION OF THE PREFERRED EMBODIMENTS

The present invention is directed towards an apparatus for an efficient distribution of grass clippings in a grass collection system. For purposes of providing a detailed description of the preferred embodiments of this invention, the invention is described as a one piece plastic part having two ridges and for directing divergent airflows into a grass collection hopper and supported by fastening means which are bolted into the lower portion of the deflector system. It should be readily understood that the teachings of the present invention are not limited to the specific type of deflector system described herein and can be extended to a variety of deflector devices. For example, such deflector systems can include any number of ridges, any number of divergent airflows, and a composition other than the plastic described herein.

Figure 1:
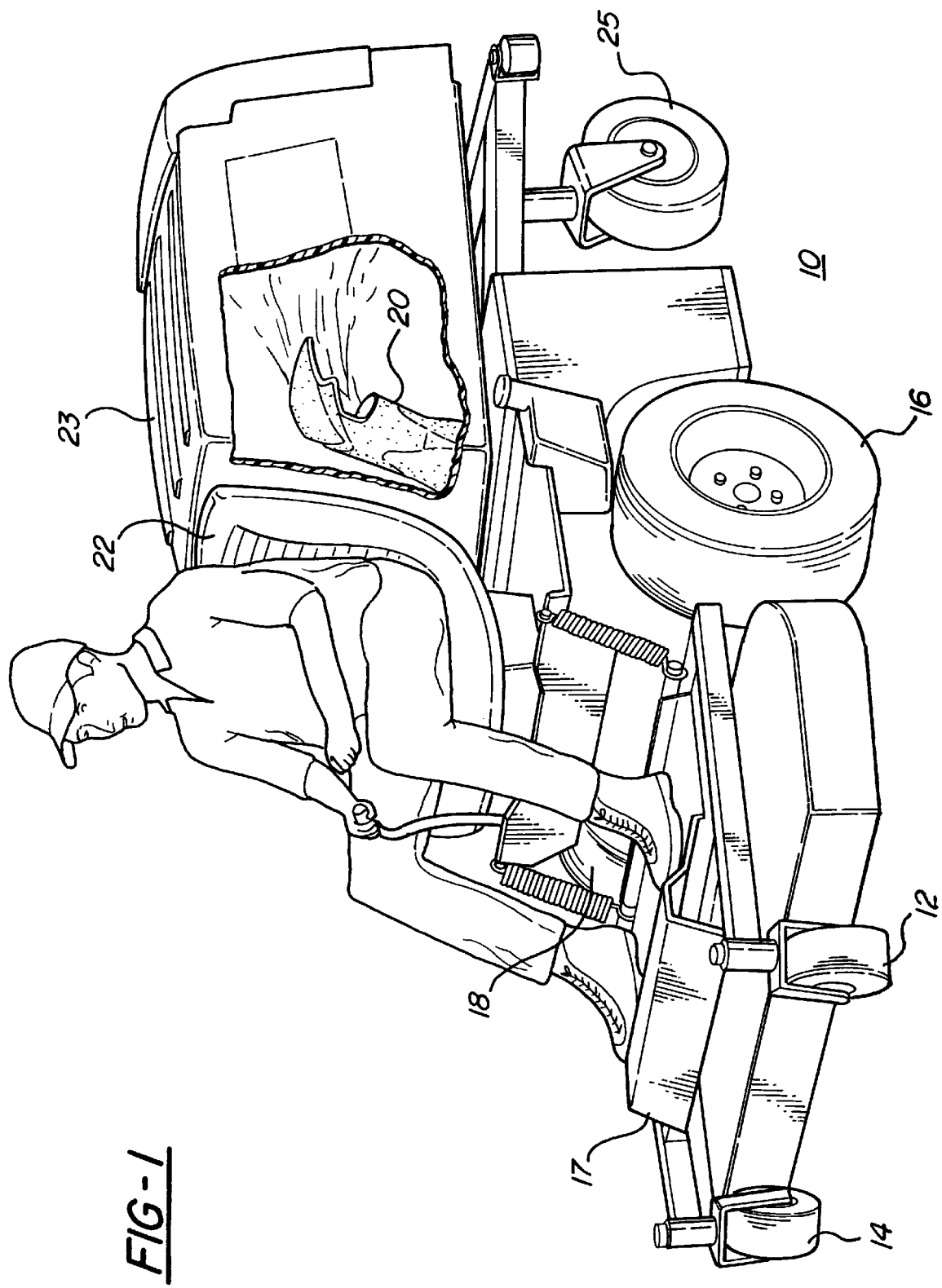
FIG. 1 is an overall view of a riding lawn mower with a cutaway view of a grass collection system showing the deflector system of the present invention.

FIG. 1 illustrates a general arrangement of a riding lawn mower 10. The mower is supported by a pair of front wheels 12,14 and a pair of front drive wheels 16,18 and a trailing wheel 25 at the rear of the vehicle and a freely rotatable about a vertical axis. The mower 10 includes an operator's seat 22 carried toward the forward end 17 of the vehicle body. The mower 10 also includes a grass collection container 23 for collecting grass clippings.

Figure 2:
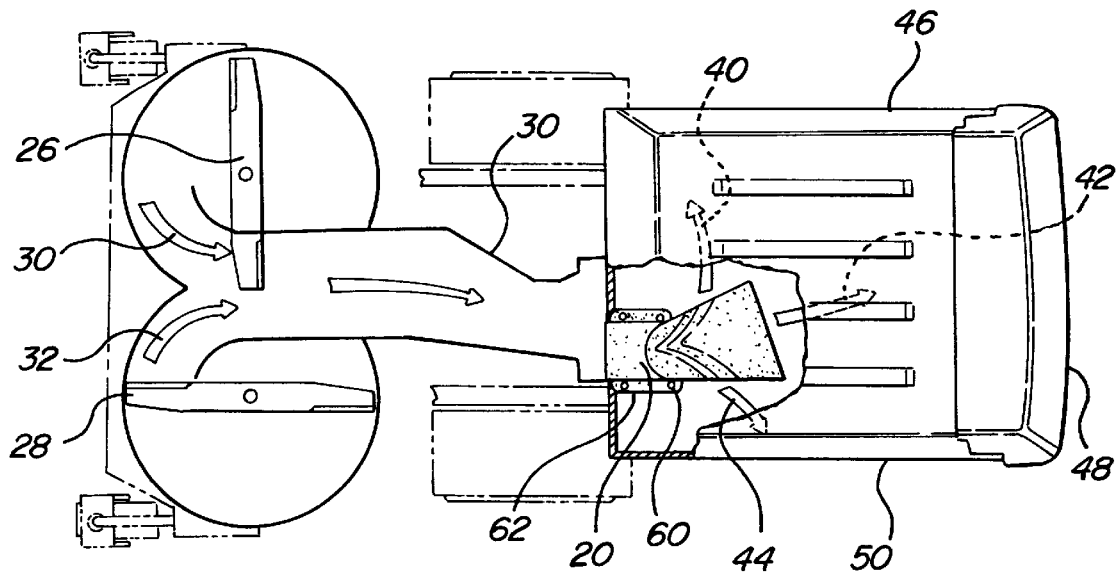
FIG. 2 is a top view of an operational block diagram of piping and grass flow in a grass collection system.
Figure 3:
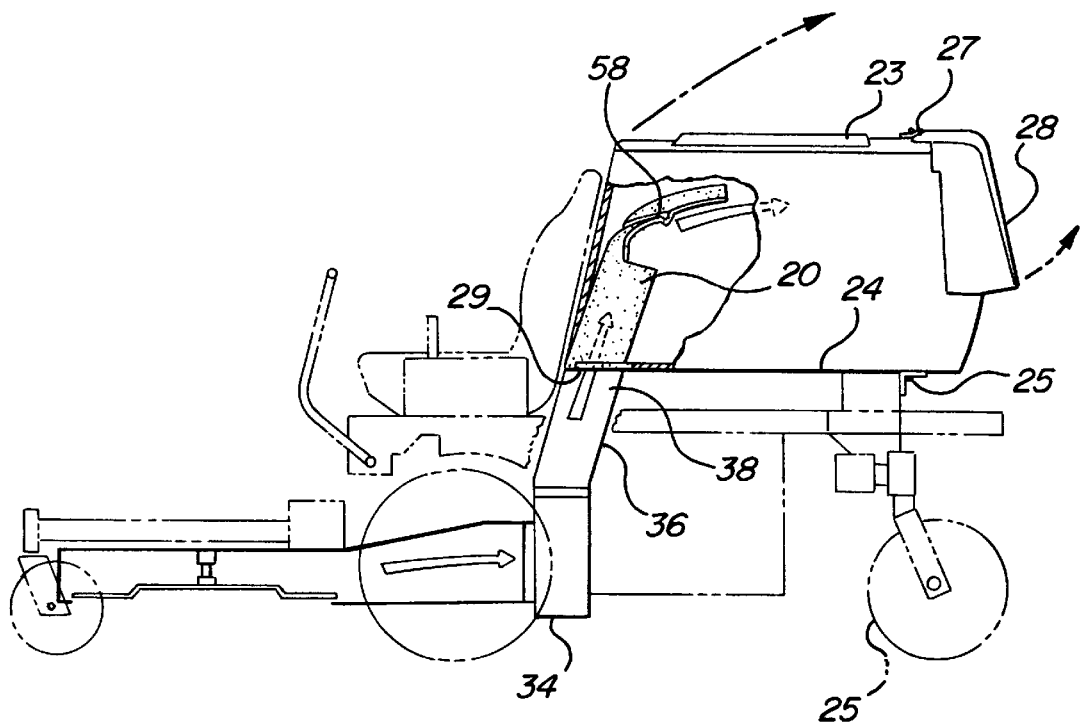
FIG. 3 is a side view of an operational block diagram of piping and grass flow in a grass collection system.
Figure 5:
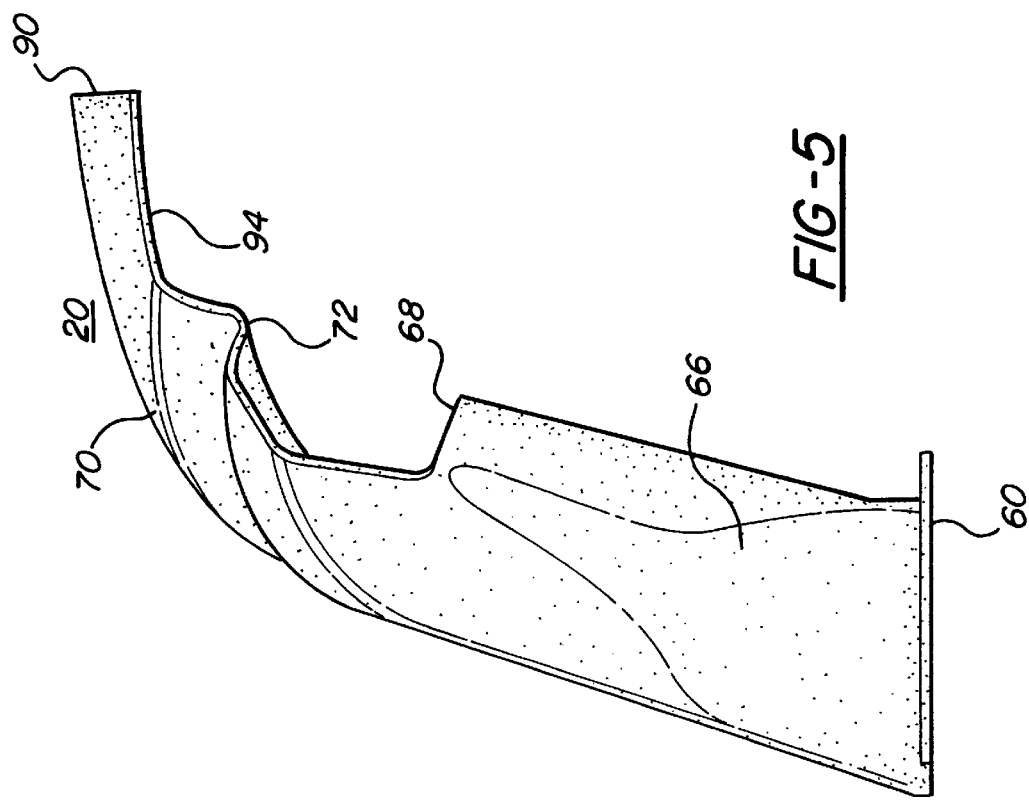
FIG. 5 is a side view of the deflector system of the present invention.

Referring to FIG. 2, a cutter assembly 24 is located immediately in front of the driver's seat 22 and has two blades 26,28. The two blades 26,28 are driven for rotation in the opposite direction, which direction is such that the blade tips, in the front position of their orbits, are moving towards the discharge side of the mower of the cutter assembly 22. As the right blade 26 and the left blade 28 rotate at high speed, their lift portions generate an updraft whereby the grass beneath them is raised and straightened for cutting to uniform height. The right blade airflow 30 generated by the right blade 26 and the left blade airflow 32 generated by the left blade 28 are discharged into the combined airflow duct 30 as a fast flowing stream in which the clippings are entrained in the airflow stream. A motor 34, preferably of the centrifugal type, further accelerates the airflow as it leaves the combined airflow duct 30 and is transported into the motor outlet duct 36. The motor outlet duct airflow 36 enters the deflector system 20. The deflector system 20 deflects the motor outlet duct airflow 38 into a right side airflow 40 directed at a right side wall 46 of the clipping collector and a rear wall airflow 42 directed at a rear wall 48 of the clipping collector and a left side airflow 44 directed at a left side 50 of the clipping collector. In the preferred embodiment, the three airflows are balanced to maintain an even distribution of grass clippings in the clipping collector.

Figure 4:
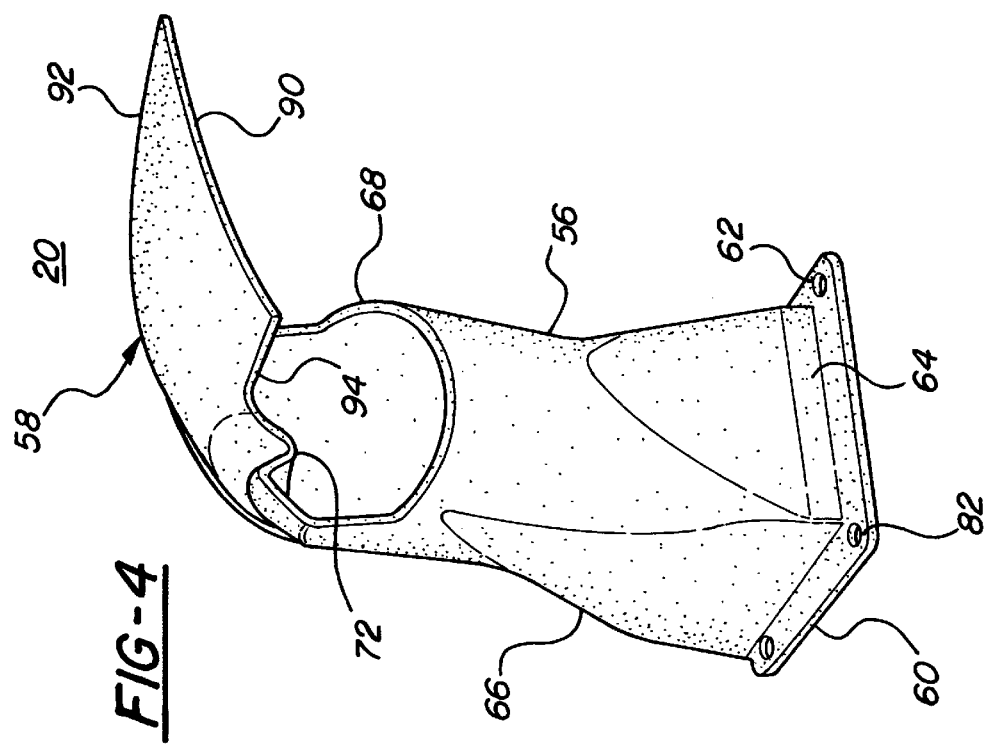
FIG. 4 is a perspective view of a deflector system of the present invention.
Figure 6:
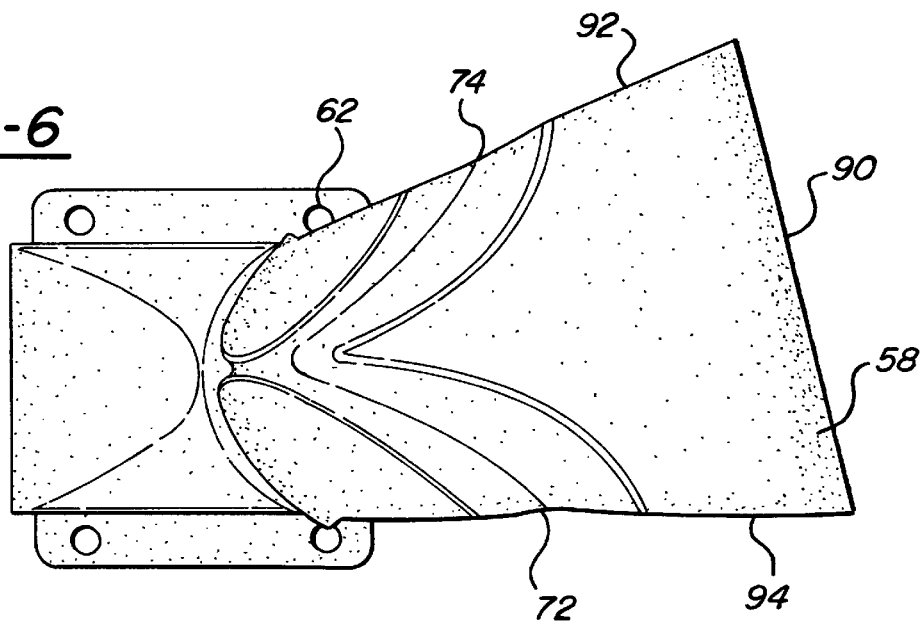
FIG. 6 is a top view of the deflector system of the present invention.
Figure 7:
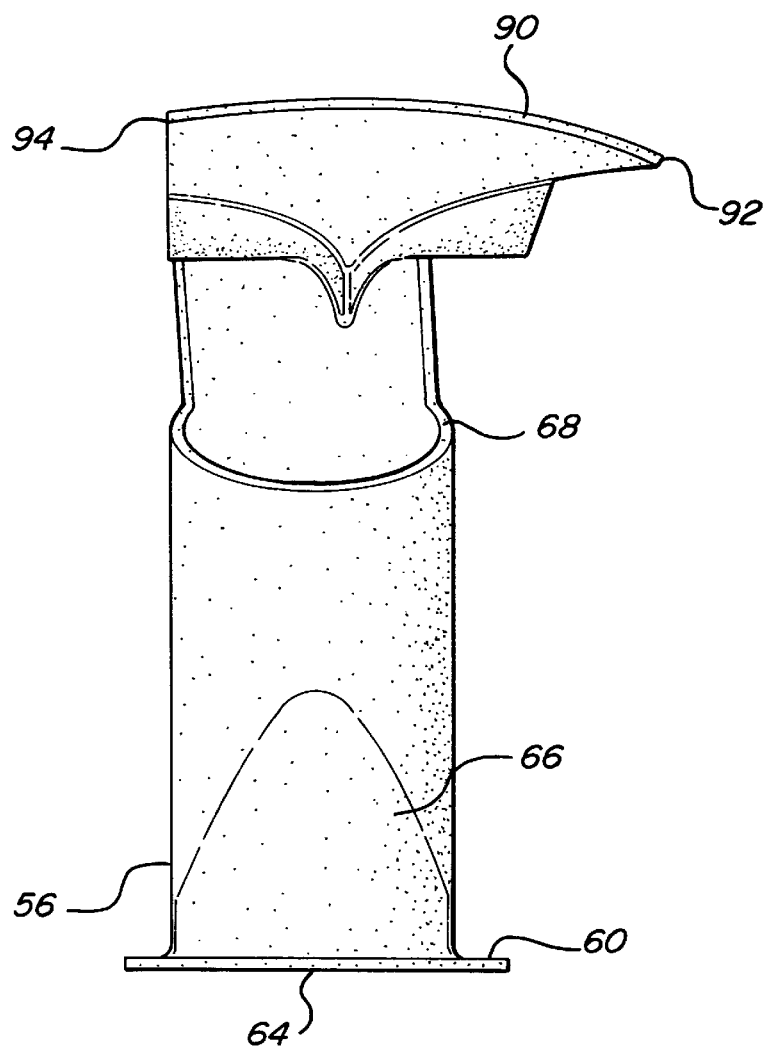
FIG. 7 is a rear view of the deflector system of the present invention.

Referring to FIG. 4, which illustrates a perspective view of the deflector system 20, the deflector system 20 has a lower body portion 56, having substantially closed side walls, and a top discharge member 58.

The lower body portion 56 includes an open bottom portion having a plurality of surfaces 60 extending in a generally horizontal direction and a fastening means 62 contained on the surface of extending in a generally horizontal direction. The lower body portion 56 further includes a lower intake 64 having a plurality of planar surfaces for channeling the airflow from the motor outlet duct 36 to a transition means 66. The transition means 66 channels the airflow to an open top portion 68 where the open top portion 68 has a cross-sectional area less than the open bottom portion. The deflector system 20 having a top discharge member 58 that includes a plurality of curved regions 70 and a pair of V-shaped ridges 72,74 for dividing the airflow and grass clippings into the grass collection container 23.

Grass collection container 23 has a floor portion 24 with an opening 29 aligned with motor outlet duct 36. The deflector 20 is coupled to the floor portion 24 over the opening 29 using the standard fasteners [not shown] allowing floor coupling between the chute 20 and the motor outlet duct 36. Grass collection container 23 can be rotated about hinge 25 to facilitate removal of the grass clippings. Door 28 is provided and rotates about hinge 27 to facilitate easy cleaning of the container. The opening 29 over laps the motor outlet duct 36 by ¾ of an inch to reduce the effect of leakage at their union.

Looking now to FIGS. 3 through 9, the lower intake 64 of the lower body portion 56 where the plurality of planar surfaces further include four planar surfaces determining a rectangular cross-sectional area 75. In the preferred embodiment the rectangular cross-section 75 has an area of about 25 square inches and the planar surface extend to a height of about 3 inches.

The plurality of surfaces 60 of the open bottom portion extending in a generally horizontal direction with each surface having a flat surface where each flat surface extends in a perpendicular direction from the lower intake walls 64. In the preferred embodiment, the chute is a one-piece rotationally molded component made of medium density polyethylene material 5 mm thick. The flat surfaces include a first surface 76, a second surface 78, and a third surface 80 where each surface extends from a planar surface of the lower intake 64.

The lower body portion 56 is shown at a generally inclined angle where the angle is measured from a vertical line perpendicular to the horizontal plane. The horizontal plane is defined as a plane that is parallel to the plurality of surfaces 60 of the open bottom portion extending in a generally horizontal direction. The preferred embodiment has a range of angles between 5° to 60° with 10° to 45° being preferred and the commercial embodiment having an angle of 18°.

The transition means 66 includes two connections. A first connection includes a connection to the lower intake 64 where the transition means 66 at the point of connection is rectangular. The second connection includes a connection to the open top portion 68 where the preferred cross-section of the transition means 66 is a circle. It should be noted that the cross sectional shape of open top portion 68 need not be a circle, but can any other suitable shape which allow efficient airflow. The transition means 66 is further defined by an outside surface, where the outside surface that is adjacent to the lower intake 64 includes four planar walls. Each of the edges of the planar walls gradually converge with another edge to form a curved surface. In the preferred embodiment the transition means 66 extends for a distance of about 4.5 inches.

The substantially curved surface is connected to the open top portion 68. The substantially curved surface includes an end portion 90 of the curved surface that extends in a generally horizontal direction relative to the surfaces a plane defined by the plurality of surfaces of the open bottom portion. The right edge 92 of the substantially curved surface extends toward the rear portion of the grass collection container 23 at a generally acute angle relative to a line perpendicular to the rear wall 48 of the clipping collector. The left edge 94 of the substantially curved surface extends toward the rear portion of the grass collection container 23 in a generally parallel direction relative to a line perpendicular to the rear wall 48 of the grass collection container 23.

The plurality of curved regions 70 form substantially V-shaped ridges. In the preferred embodiment the plurality of curved regions 70 form a right V-shaped ridge 72 and a left V-shaped ridge 74. Each V-shaped ridge is formed at a point located midway along the right edge 92 and the left edge 94 of the curved surface and adjacent to the connection of the lower body portion 56. Each V-shaped ridge diverges from the point of formation and extends along an arc. The depth of the V-shaped ridge varies along the length of the arc. In the preferred embodiment the depth increases gradually from zero at the formation point to a depth of 14.29 mm located at the edges. The top portion of the right V-shaped ridge 72 and a horizontal line define a range of angles in the preferred embodiment as 50° to 75° and for the left V-shaped ridge and a horizontal line defining a range of angles in the preferred embodiment as 130° to 100°. It is important to note that while the present embodiment includes two V-shaped ridges, the broader aspects of the present invention are not limited to any particular size, shape or number of curved regions, but rather include the principles of separately directing streams of airborne grass clippings into divergent locations by providing air-diverging structures connected to a common chute or chute portion.

While specific embodiments have been shown and described in detail to illustrate the principles of the deflector system, it will be understood that the invention may be embodied otherwise without departing from such principles. For example, one skilled in the art will readily recognize from such discussion and from the accompanying drawings and claims that various changes, modifications and variations can be made therein without departing from the spirit and scope of the invention as described in the following claims.

What is claimed is:

1. A passive distribution deflector for use in a grass collection system on a riding mower or the like, the deflector system comprising:

a lower body portion having substantially closed side walls and an open bottom portion, and an open top portion having a cross-sectional area less than the open bottom portion;

a top discharge member formed on a deflector surface having a plurality of curved regions, connected to said lower body portion, the curved regions each having longitudinal axis of pointing in a direction different from the longitudinal axis of the lower portion, and;

the curved regions of the top discharge member are separated from one another by at least one ridge portion.

2. The apparatus of claim 1 wherein the lower body portion includes a transition means having a decreasing cross sectional area that is connected to the open bottom portion and the open top portion and a cylindrical surface where adjacent to the open bottom portion the transition means defines four planar surfaces and the open top portion defines a cylindrical surface.

3. The apparatus of claim 2 wherein the cross sectional area of the transition means decreases at a gradual rate.

4. The apparatus of claim 1 wherein the open bottom portion of the lower body portion includes a surface extending horizontally from the substantially closed side walls of the lower body portion the surface extending horizontally and having a fastening means for connecting the deflector structure with a grass collection container of the grass collection system.

5. The apparatus of claim 4 wherein the fastening means includes a plurality of bores contained on the surface extending horizontally from the substantially closed side walls for engaging a tightening means within the bore.

6. The apparatus of claim 4 wherein the substantially closed side walls, include a lower intake connected to said surface extending horizontally from the substantially closed side walls where said walls form four planar surfaces.

7. The apparatus of claim 5 wherein the substantially closed side walls include a lower intake connected to the surface extending horizontally from the substantially closed walls defining four planar surfaces.

8. The apparatus of claim 1 wherein the open top portion is substantially cylindrical.

9. The apparatus of claim 1 wherein an angle defined by a line measured between a point on the lower intake and the nearest point on the open top portion, and a vertical line is within a range 5° and 60°.

10. The apparatus of claim 1 further comprising a grass collection system having a grass collection container where the lower body portion is connected to an inside surface of a grass collection container by a fastening means.

11. The apparatus of claim 1 wherein the top discharge member includes a concave surface having the plurality of curved regions formed on the concave surface.

12. The apparatus of claim 11 wherein each plurality of curved regions have at least one ridge formed between each curved region and each ridge is defined by two portions of the concave surface forming a substantially V-shaped ridge.

13. The apparatus of claim 12 having a right v-shaped ridge and a left v-shaped ridge where the top portion of the right v-shaped ridge and a horizontal line define a range of angles between 130° and 100° and a left V-shaped ridge and a horizontal line define a range of angles between about 50° and about 75°.

14. The apparatus of claim 12 having a right v-shaped ridge and a left v-shaped ridge where each ridge has a maximum extension from the concave surface between the range of about 5 mm to about 20 mm.

15. The apparatus of claim 1 wherein the plurality of curved regions having three separate curved regions for projecting a separate first, second and third longitudinal airflow.

16. The apparatus of claim 10 wherein a first separate airflow is directed to a first inside surface of the grass collection container, a second separate airflow is directed to a second inside surface, and a third separate airflow is directed to a third inside surface.

17. The apparatus of claim 1 wherein the deflector system is composed of a medium density polyethylene material.

18. The apparatus of claim 1 wherein the substantially closed walls and the deflector surface have a range of thickness between 2.5 mm to 10 mm.

* * * * *